United States Patent
Li et al.

(10) Patent No.: US 10,501,705 B2
(45) Date of Patent: Dec. 10, 2019

(54) METHOD OF PROCESSING EDIBLE OIL

(71) Applicants: JIANGSU FUSHENG BIOTECHNOLOGY CO. LTD, Jiangyin (CN); Shiming Li, Glastonbury, CT (US)

(72) Inventors: Shiming Li, Glastonbury, CT (US); Jieyu Zhu, Wuhan (CN); Dehe Liu, Jiangyin (CN); Xueyin Ren, Jiangyin (CN)

(73) Assignee: Jiangsu DEHE Biotechnology Co., Ltd, Jiangyin, Jiangsu (CN)

( * ) Notice: Subject to any disclaimer, the term of this patent is extended or adjusted under 35 U.S.C. 154(b) by 0 days.

(21) Appl. No.: 15/735,559

(22) PCT Filed: Jun. 13, 2015

(86) PCT No.: PCT/US2015/035709
§ 371 (c)(1),
(2) Date: Dec. 11, 2017

(87) PCT Pub. No.: WO2016/204715
PCT Pub. Date: Dec. 22, 2016

(65) Prior Publication Data
US 2018/0355277 A1  Dec. 13, 2018

(51) Int. Cl.
*C11B 5/00* (2006.01)
*A23D 9/007* (2006.01)
*A23D 9/02* (2006.01)

(52) U.S. Cl.
CPC ............ *C11B 5/0092* (2013.01); *A23D 9/007* (2013.01); *A23D 9/02* (2013.01); *C11B 5/0085* (2013.01)

(58) Field of Classification Search
CPC .............................. C11B 5/0092; A23D 9/007
USPC ............................................................ 554/3
See application file for complete search history.

(56) References Cited

U.S. PATENT DOCUMENTS

| | | | | |
|---|---|---|---|---|
| 2004/0013788 A1* | 1/2004 | Seki | ......................... | A21D 2/14 426/601 |
| 2004/0134855 A1* | 7/2004 | Sleeter | ................... | B01J 20/283 210/635 |
| 2004/0158083 A1* | 8/2004 | Choo | ...................... | C11B 3/001 549/413 |
| 2012/0219647 A1* | 8/2012 | Breivik | ................. | C11B 5/0085 424/745 |
| 2015/0159117 A1* | 6/2015 | Kano | ..................... | A23D 9/007 426/546 |

* cited by examiner

*Primary Examiner* — Deboarh D Carr
(74) *Attorney, Agent, or Firm* — Bin Lu

(57) ABSTRACT

This invention provides a method of using hydrophilic natural antioxidants to improve or preserve oxidative stability of edible oil. The method has been shown to be effective in reducing peroxide values of edible oil over a storage period. As such, it is suitable and safe for wide use in edible oil products.

15 Claims, No Drawings

METHOD OF PROCESSING EDIBLE OIL

BACKGROUND

Edible oil, especially the so-called healthy edible oil such as fish oil and soybean oil, contains abundant monounsaturated fatty acids and/or polyunsaturated fatty acids. Studies have shown that unsaturated fatty acids, e.g., omega-3 polyunsaturated fatty acids, have the effect of lowering blood cholesterol levels and reducing the risks of cardiovascular diseases. Yet, due to the presence of double bonds in these unsaturated fatty acids, they are very vulnerable to lipid oxidation, which severely affects quality and shelf life of those oil rich in unsaturated fatty acids.

Antioxidants can be used to prevent excessive lipid oxidation. However, butylated hydroxytoluene (BHT) and butylated hydroxyanisole (BHA), two commonly used antioxidants in lipids, are implicated in a possible role of promoting tumor growth. Vitamin E, another well-known antioxidant, has been shown to be ineffective at least in reducing peroxide values in fish oil. While natural antioxidants, e.g., epigallocatechin gallate (EGCG) from tea and camosic acid from rosemary, bring a reliable safety profile and other desirable health benefits such as anti-cancer effects, they are traditionally deemed unsuitable for use in oil due to their high hydrophilicity.

Clearly, there is a demand for healthy edible oil that can maintain quality over a long shelf life. A need thus exists to find a suitable antioxidant and develop an effective and economical method to improve or preserve oxidative stability of edible oil.

SUMMARY

This invention provides a method of using hydrophilic natural antioxidants to improve or preserve oxidative stability of edible oil. The method has been shown to be effective in reducing peroxide values of edible oil over a storage period. As such, it is suitable and safe for wide use in edible oil products.

One aspect of this invention relates to a method for improving oxidative stability of edible oil. The method includes the following steps: (i) mixing at least one hydrophilic natural antioxidant in a high polarity oil at a temperature of 5-200° C. (preferably, 10-100° C., and, more preferably, 25-40° C.) to obtain an antioxidant oil mixture containing the hydrophilic natural antioxidant 0.04-50 wt % (preferably, 0.04-40 wt %, and, more preferably, 0.04-20 wt %); and (ii) mixing the antioxidant oil mixture in the edible oil so that the hydrophilic natural antioxidant has a concentration of 10-1000 ppm (preferably, 50-500 ppm, and, more preferably, 100-200 ppm) by weight.

Examples of the hydrophilic natural antioxidant include, but are not limited to, a polyphenole-containing composition, a plant extract, epigallocatechin gallate (EGCG), catechin, epicatechin, epigallocatechin, epicatechin gallate, quercetin, hesperidin, pterostilbene, proanthocyanidin, and carnosic acid. The polyphenole-containing composition can includes at least one of green tea, black tea, white tea, and oolong tea; and the plant extract can be at least one of an apple extract, an orange/citrus extracts, a blueberry extract, a rosemary extract, and a sesame extract.

One particular example of the hydrophilic natural antioxidant is EGCG. Another particular example is carnosic acid.

The high polarity oil can be propylene glycol caprylate, medium chain monoglyceride, or medium chain triglyceride. Examples of the medium chain triglyceride include caprylic triglyceride.

The antioxidant oil mixture can be a solution or an emulsion. In one embodiment of the method when the high polarity oil is propylene glycol caprylate, the antioxidant oil mixture is a solution.

Typically in the method of this invention, the mixing at least one hydrophilic natural antioxidant in the high polarity oil is performed under ultrasonication.

Edible oil that this method can be applied to includes fish oil, soybean oil, and other vegetable oil.

Optionally, the method of this invention further includes a step of pretreating the edible oil to remove polar oxidized components therein before mixing the edible oil with the antioxidant oil mixture. This additional step includes, first, filtering the edible oil through silica gel chromatography; then, applying a nonpolar volatile solvent to elute the edible oil from the silica gel; and last, removing the nonpolar volatile solvent from the edible oil by evaporation.

In the above-described pretreating step, the nonpolar volatile solvent can be hexane or to other nonpolar volatile solvent, and a volume ratio of silica gel to the edible oil is 1:1 to 1:20.

The method of this invention typically includes the pretreating step when processing fish oil.

The details of the invention are set forth in the description below. Other features, objects, and advantages of the invention will be apparent from the description and from the claims.

DETAILED DESCRIPTION

Natural antioxidants are preferable to synthetic antioxidants for use in food products as the former usually has a more desirable safety profile than the latter. The method of this invention utilizes a high polarity oil as an intermediate solvent to distribute a otherwise hydrophilic natural antioxidant into hydrophobic oil such as fish oil and soybean oil. Further, the method can enhance the distribution of the natural antioxidant at an oil/air interface, an area where the natural antioxidant can be more effective preventing lipid oxidation.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

EXAMPLE 1: Preserving Oxidative Stability of Fish Oil with EGCG 1.2 g EGCG was dissolved in 8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had an EGCG concentration of 13 wt %

Next, a silicon gel column was packed using wet packing method with hexane for removing polar oxidized components from fish oil. 90 ml of fish oil (Menhaden oil) was gradually added into the silicon gel column. The volume ratio of silica gel to fish oil is 1:1. A vacuum pump filtration method was applied as follows. The silicon gel column was washed by 180 ml of hexane, which was later evaporated under vacuum. After vacuum evaporation of the hexane, 70 ml of refined fish oil was obtained.

The EGCG-containing antioxidant oil solution was mixed vigorously with the refined fish oil in a ratio of 1:749 with the assistance of vortex until the fish oil mixture became clear and transparent. The fish oil mixture thus obtained had an EGCG concentration of 173 ppm.

The peroxide value of the fish oil mixture was measured after it was stored at 60° C. in dark for three days. For the peroxide value testing, 2.00±0.02 g of the fish oil mixture was collected into a 100 ml glass stoppered Erlenmeyer flask as a testing sample. Next, 12 ml of an acetic acid/chloroform solution (v/v, 3:2) was added to the flask followed by swirling the flask until the sample was completely dissolved. 0.2 ml of saturated potassium iodide solution was added into the flask, which was then swirled for exactly one minute before adding 30 ml of distilled water into the flask and shaking the flask vigorously to liberate the iodine from the chloroform layer. Finally, 0.1N sodium thiosulfate was used to titrate oxidized iodine and, with 1 ml of starch solution as indicator, titration was performed until the blue gray color disappeared in the upper aqueous layer.

The results show that the peroxide value of the fish oil mixture having an EGCG concentration of 173 ppm was reduced by 15.2% as compared with a control. Conventionally, the highest amount of BHA in fish oil is 0.2 g/kg (i.e. 200 ppm). A previous study showed that, under the same storage condition, the peroxide value value of a fish oil sample containing 200 ppm BHA was reduced only by 7.8% as compared with a control. Thus, the method of this invention unexpectedly exhibits a better effect in preserving oxidative stability of fish oil.

EXAMPLE 2: Preserving Oxidative Stability of Fish Oil with Carnosic Acid 1.2 g carnosic acid was dissolved in 8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had a carnosic acid concentration of 13 wt %

Fish oil was refined through silicon gel chromatography according to the procedure described in Example 1.

The carnosic acid-containing antioxidant oil solution was mixed vigorously with the refined fish oil in a ratio of 1:749 with the assistance of vortex until the fish oil mixture became clear and transparent. The fish oil mixture thus obtained had a carnosic acid concentration of 173 ppm.

The fish oil mixture was stored at 60° C. in dark for three day and the peroxide value was measured according to the procedure described in Example 1. The results show that the peroxide value of the fish oil mixture having a carnosic acid concentration of 173 ppm was reduced by 41.9% as compared with a control. Thus, the method of this invention unexpectedly exhibits a much better effect in preserving oxidative stability fish oil.

EXAMPLE 3: Preserving Oxidative Stability of Soybean Oil with EGCG 0.2 g EGCG was dissolved in 1.8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had an EGCG concentration of 10 wt %

The EGCG-containing antioxidant oil solution was mixed vigorously with the soybean oil in a ratio of 1:499 with the assistance of vortex until the soybean oil mixture became clear and transparent. The soybean oil mixture thus obtained had an EGCG concentration of 200 ppm.

The soybean oil mixture was stored at 30° C. in dark for 7 days and the peroxide value was measured according to the procedure described in Example 1. The results indicate no quantitative peroxide value difference among the soybean oil mixture, a control, and a soybean oil sample containing 200 ppm BHA. The study shows that soybean oil is quite stable when stored at 30° C. for 7 days.

EXAMPLE 4: Preserving Oxidative Stability of Soybean Oil with EGCG 0.2 g EGCG was dissolved in 1.8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had an EGCG concentration of 10 wt %

The EGCG-containing antioxidant oil solution was mixed vigorously with the soybean oil in a ratio of 1:665.7 with the assistance of vortex until the soybean oil mixture became clear and transparent. The soybean oil mixture thus obtained had an EGCG concentration of 150 ppm.

The soybean oil mixture was stored at 30° C. in dark for 7 days and the peroxide value was measured according to the procedure described in Example 1. The results indicate no quantitative peroxide value difference among the soybean oil mixture, a control, and a soybean oil sample containing 150 ppm BHA. The study shows that soybean oil is quite stable when stored at 30° C. for 7 days.

EXAMPLE 5: Preserving Oxidative Stability of Soybean Oil with EGCG 0.2 g EGCG was dissolved in 1.8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had an EGCG concentration of 10 wt %

The EGCG-containing antioxidant oil solution was mixed vigorously with the soybean oil in a ratio of 1:999 with the assistance of vortex until the soybean oil mixture became clear and transparent. The soybean oil mixture thus obtained had an EGCG concentration of 100 ppm.

The soybean oil mixture was stored at 30° C. in dark for 7 days and the peroxide value was measured according to the procedure described in Example 1. The results indicate no quantitative peroxide value difference among the soybean oil mixture, a control, and a soybean oil sample containing 100 ppm BHA. The study shows that soybean oil is quite stable when stored at 30° C. for 7 days.

EXAMPLE 6: Preserving Oxidative Stability of Soybean Oil with EGCG 0.2 g EGCG was dissolved in 1.8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had an EGCG concentration of 10 wt %

The EGCG-containing antioxidant oil solution was mixed vigorously with the soybean oil in a ratio of 1:665.7 with the assistance of vortex until the soybean oil mixture became clear and transparent. The soybean oil mixture thus obtained had an EGCG concentration of 150 ppm.

The soybean oil mixture was stored at 40° C. in dark for 7 days and the peroxide value was measured according to the procedure described in Example 1. The results show that the peroxide value of the oil mixture having 150 ppm EGCG was reduced by 4.6% as compared with a control, while the peroxide value of a soybean oil sample containing 150 ppm BHA is almost the same as the control. Thus, the method of this invention exhibits a better effect in preserving oxidative stability of soybean oil.

EXAMPLE 7: Preserving Oxidative Stability of Soybean Oil with EGCG 0.2 g EGCG was dissolved in 1.8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had an EGCG concentration of 10 wt %

The EGCG-containing antioxidant oil solution was mixed vigorously with the soybean oil in a ratio of 1:665.7 with the assistance of vortex until the soybean oil mixture became clear and transparent. The soybean oil mixture thus obtained had an EGCG concentration of 150 ppm.

The soybean oil mixture was stored at 60° C. in dark for 7 days and the peroxide value was measured according to the procedure described in Example 1. The results indicate no quantitative peroxide value difference between the EGCG-containing soybean oil mixture and a control.

EXAMPLE 8: Preserving Oxidative Stability of Soybean Oil with Carnosic Acid 0.2 g carnosic acid was dissolved in 1.8 g of propylene glycol caprylate by ultrasonication to achieve a clear and transparent solution. The dissolution was performed under a temperature between 25° C. and 40° C. and the temperature could be affected by the ultrasonication. The antioxidant oil solution thus obtained had a carnosic acid concentration of 10 wt %

The carnosic acid-containing antioxidant oil solution was mixed vigorously with the soybean oil in a ratio of 1:665.7 with the assistance of vortex until the soybean oil mixture became clear and transparent. The soybean oil mixture thus obtained had a carnosic acid concentration of 150 ppm.

The soybean oil mixture was stored at 60° C. in dark for 7 days and the peroxide value was measured according to the procedure described in Example 1. The results indicate no quantitative peroxide value difference between the carnosic acid-containing soybean oil mixture and a control.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method for improving oxidative stability of edible oil, the method comprising:
    mixing at least one hydrophilic natural antioxidant in a high polarity oil at a temperature of 25-40° C. to obtain an antioxidant oil mixture containing the hydrophilic natural antioxidant 0.04-50 wt;
    mixing the antioxidant oil mixture in the edible oil so that the hydrophilic natural antioxidant has a concentration of 10-1000 ppm by weight,
    wherein the hydrophilic natural antioxidant is epigallocatechin gallate (EGCG) or carnosic acid.

2. The method of claim 1, further comprising pretreating the edible oil to remove polar oxidized components therein before mixing with the antioxidant oil, mixture, wherein the pretreating comprises:
    filtering the edible oil through silica gel chromatography;
    applying a nonpolar volatile solvent to elute the edible Rom the silica gel; and
    removing the nonpolar volatile solvent from the edible oil by evaporation.

3. The method of claim 2, wherein the edible oil is fish oil.

4. The method of claim 2, wherein the nonpolar volatile solvent is hexane.

5. The method of claim 2, wherein a volume ratio of silica gel to the edible oil is 1:1 to 1:20.

6. The method of claim 1, wherein the edible oil is soybean oil.

7. The method of claim 1, wherein the antioxidant oil mixture is a solution.

8. The method of claim 7, wherein the high polarity oil is propylene glycol caprylate.

9. The method of claim 1, wherein the antioxidant oil mixture is an emulsion.

10. The method of claim 1, wherein the antioxidant oil mixture contains the hydrophilic natural antioxidant 0.04-20 wt %.

11. The method of claim 1, wherein after mixing the antioxidant oil mixture in the edible oil, the hydrophilic natural antioxidant has a concentration of 100-200 ppm by weight.

12. A method for improving oxidative stability of edible oil, the method comprising:
    mixing a hydrophilic natural antioxidant in a high polarity oil at a temperature of 5-200° C. to obtain an antioxidant oil mixture containing the hydrophilic natural antioxidant 0.04-50 wt %;
    mixing the antioxidant oil mixture in the edible oil so that the hydrophilic natural antioxidant has a concentration of 10-1000 ppm by weight,
    wherein the hydrophilic natural antioxidant is carnosic acid.

13. The method of claim 1, wherein the high polarity oil is propylene glycol caprylate, medium chain monoglyceride, or medium chain triglyceride.

14. The method of claim 13, wherein the medium chain triglyceride is caprylic triglyceride.

15. The method of claim 1, wherein the mixing at least one hydrophilic natural antioxidant in the high polarity oil is performed under ultrasonication.

\* \* \* \* \*